United States Patent
Staahl et al.

(10) Patent No.: US 11,858,303 B2
(45) Date of Patent: Jan. 2, 2024

(54) TRUCK TRAILER INTERFACE

(71) Applicant: KNORR-BREMSE Systeme fuer Nutzfahrzeuge GmbH, Munich (DE)

(72) Inventors: Christian Staahl, Munich (DE); Matthew Fry, Wraxall (GB); Jochen Retter, Holzgerlingen (DE); Tibor Kandar, Sukoro (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/058,306

(22) PCT Filed: May 27, 2019

(86) PCT No.: PCT/EP2019/063695
§ 371 (c)(1),
(2) Date: Nov. 24, 2020

(87) PCT Pub. No.: WO2019/224402
PCT Pub. Date: Nov. 28, 2019

(65) Prior Publication Data
US 2021/0188026 A1    Jun. 24, 2021

(30) Foreign Application Priority Data

May 25, 2018   (GB) .................................. 1808626

(51) Int. Cl.
*G06F 13/38*   (2006.01)
*B60D 1/64*    (2006.01)
*G08C 15/06*   (2006.01)

(52) U.S. Cl.
CPC ............. *B60D 1/64* (2013.01); *G06F 13/382* (2013.01); *G08C 15/06* (2013.01)

(58) Field of Classification Search
CPC .......... B60D 1/64; G06F 13/382; G08C 15/06
See application file for complete search history.

(56) References Cited

U.S. PATENT DOCUMENTS 5,488,352 A * 1/1996 Jasper ................ H01R 13/6633
                                                  280/423.1
5,739,592 A * 4/1998 Rigsby ..................... B60D 1/62
                                                    701/32.7

(Continued)

FOREIGN PATENT DOCUMENTS

CN       102712229 A    10/2012
EP       0 546 370 A1    6/1993
(Continued)

OTHER PUBLICATIONS

Maryanka et al. ("Truck-Trailer Redundant Powerline CAN Communication", Aug. 1, 2012, XP093010262 4 pages) (Year: 2012).*

(Continued)

*Primary Examiner* — Patrick C Chen
(74) *Attorney, Agent, or Firm* — Crowell & Moring LLP

(57) ABSTRACT

A communication interface is provided between a towing vehicle and a trailer, which are connected by a plurality of connectors compliant with standards selected from ISO12098, ISO7638, ISO1185, ISO3731, ISO11446. Digital signals are transmissible between the towing vehicle and the towed vehicle via an ISO11992-3 CAN bus. Pins on the towing vehicles are connected to pins on the towed vehicle by twisted pairs of wires adapted to carry a digital differential signal to provide higher speed data transmission between the vehicles.

9 Claims, 4 Drawing Sheets

(56) References Cited

U.S. PATENT DOCUMENTS

| | | | |
|---|---|---|---|
| 2012/0323443 | A1 | 12/2012 | Risse et al. |
| 2016/0052453 | A1* | 2/2016 | Nalepka ................... B60R 1/00 348/148 |
| 2017/0187472 | A1 | 6/2017 | Chini et al. |
| 2018/0244200 | A1 | 8/2018 | Moeller et al. |
| 2020/0244478 | A1 | 7/2020 | Dieckmann et al. |

FOREIGN PATENT DOCUMENTS

| | | | |
|---|---|---|---|
| EP | 1 702 802 | A1 | 9/2006 |
| EP | 2 228 239 | A1 | 9/2010 |
| EP | 2 181 869 | B1 | 10/2012 |
| EP | 3 367 678 | A1 | 8/2018 |
| GB | 2493478 | A | 2/2013 |
| WO | WO 93/26062 | A1 | 12/1993 |
| WO | WO 0074078 | A1 * | 12/2000 |
| WO | WO 2013/043661 | A1 | 3/2013 |
| WO | WO 2016/028818 | A1 | 2/2016 |
| WO | WO 2018/069326 | A2 | 4/2018 |
| WO | WO 2018069326 | A2 * | 4/2018 |
| WO | WO 2019/057403 | A1 | 3/2019 |

OTHER PUBLICATIONS

International Search Report (PCT/ISA/210) issued in PCT Application No. PCT/EP2019/063695 dated Sep. 16, 2019 (three (3) pages).

Written Opinion (PCT/ISA/237) issued in PCT Application No. PCT/EP2019/063695 dated Sep. 16, 2019 (six (6) pages).

Great Britain Search Report issued in Great Britain Application No. 1808626.4 dated Mar. 12, 2019 (four (4) pages).

European Office Action issued in European Application No. 19731124.4 dated Jan. 9, 2023 (four (4) pages).

Maryanka et al., "Truck-Trailer Redundant Powerline CAN Communication," Aug. 1, 2012, Retrieved from the Internet: URL:http://www.researchgate.net/profile/Yair-Maryanka-2/publication/311650152_Truck-Trailer_Redundant_Powerline_CAN_Communication/links/5852583a08ae0c0f32224009/Truck-Trailer-Redundant-Powerline-CAN-Communication.pdf, XP093010262 (four (4) pages).

Cover Page of EP 3 685 550 A1 published Jul. 29, 2020 (one (1) page).

Chinese-language Office Action issued in Chinese Application No. 201980035240.6 dated Apr. 15, 2023 (6 pages).

* cited by examiner

TRUCK TRAILER INTERFACE

BACKGROUND AND SUMMARY OF THE INVENTION

The invention relates to an interface between a trailer and a towing vehicle, in particular, but not exclusively an interface between a heavy truck and trailer.

In order to operate in a commercially viable way, logistics operators need to be able to use their trailers in a very flexible way. One very important part of that flexibility is the possibility to pair a trailer with just about any towing vehicle in a fleet or an independent operator. The requirements associated with this flexibility are referred to as compatibility and interoperability within the industry and apply to coupling equipment, pneumatic and electrical connectors as well as communication protocols.

EP 546370 discloses a truck tractor and trailer electrical communication system having one electronic control unit located in the tractor and another electronic control unit located in at least one trailer both respectively controlling the state of a plurality of switching devices to establish the appropriate electrical connection into and out of a standard seven pin tractor/trailer electrical connector where data communication links are used for control and diagnostics.

The requirements lead to a certain degree of sluggishness with regard to technological progress in the areas covered by compatibility and interoperability. This is caused by the different age of vehicles in a fleet and the necessity of compatibility and interoperability between all of them. One example of this is the current communication protocol (ISO11992) and its maximum transfer rate of 250 kbit/s. As a consequence, large amounts of data such as those generated by modern sensors for assistance systems cannot be transferred within a given time. This prevents the application of modern sensory equipment and the associated functionality.

The non prior published EP3367678 discloses a method of transmitting video signals on a CAN bus.

The present invention therefore seeks to provide an interface suitable for a truck trailer combination which enables the use of higher data transmission rates.

According to a first aspect of the invention there is provided a communication interface between a towing vehicle and a towed vehicle, wherein the towing vehicle and the towed vehicle each have a connector, which connectors are connected by means of a cable, wherein the connectors are compliant with a standard selected from ISO12098, ISO7638-1/2, ISO1185, ISO3731, ISO11446 and have pins, wherein some of the pins are connected by twisted pairs of wires arranged to carry a digital differential signal.

According to a second aspect of the invention there is provided a connector for a standards compliant communication interface between a towing and a towed vehicle comprising an ECU adapted to be connected to a vehicle CAN bus and to vehicle lights, which ECU is configurable for high speed communication, wherein the connector is provided with a digital status detector and a high speed communication protocol driver and means for switching therebetween in dependence on detection of a ECU configurable for high speed communication on a compatible connector on a vehicle to which the connector is connected.

Although it would be possible to simply define a new interface, this would be very costly, as new vehicles would require the new interface and additionally the old ones as well. Such interface additions have been performed in Europe in the past and have resulted in redundant sets of standard connectors as a trailer typically requires four connectors under different standards ISO 12098:2004, ISO 7638-1/2:2018, ISO 1185:2003 and ISO 3731:2003 as well as 11446-1/2:2012. The North American market has only a single powerline connector as the market favors interoperability and simplicity over additional features. In this specification, high speed communication means a maximum transfer rate greater than the maximum permitted by the standard.

Exemplary embodiments of the invention will now be described in greater detail with reference to the drawings.

DETAILED DESCRIPTION OF THE DRAWINGS

Figure 1:
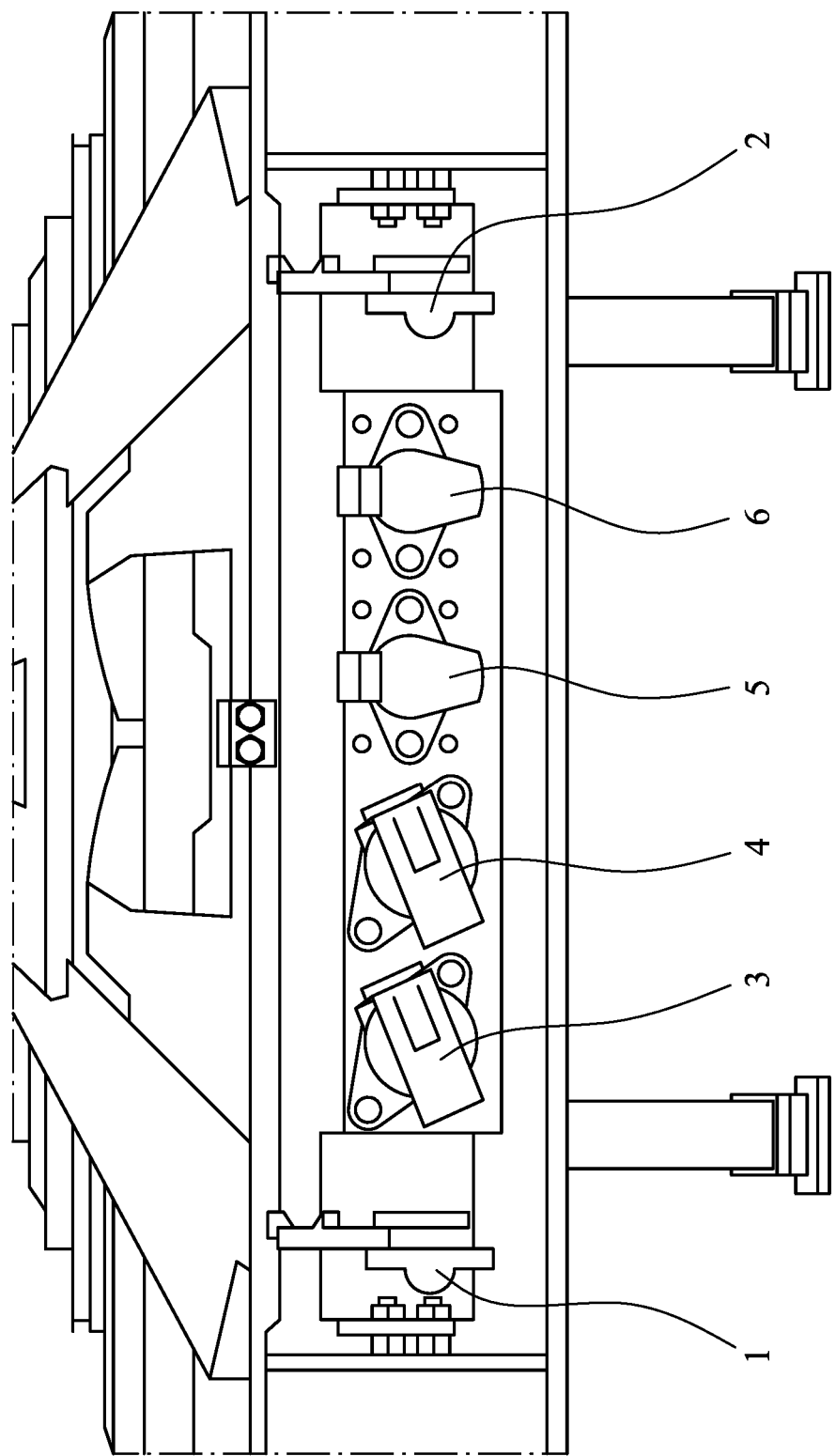
FIG. 1 shows schematically the head board of semi-trailer.

FIG. 1 shows schematically the head board of a semi-trailer in accordance with European standards having a red line pneumatic connection 1 for emergency braking and a yellow line pneumatic connection 2 for service braking. Four electrical connectors are arranged between the pneumatic connections, namely a 15 pin ISO 12098 connector 3 with CAN bus, a 7 pin ISO 7638-01 connector 4 for EBS functionality, a 7 pin ISO 1185 connector 5 and a 7 pin ISO 3731 connector 6.

In the first exemplary embodiment of the invention, the ISO12098 connector and the IEEE 802.3ab is re-purposed to provide a high speed data connection whilst ensuring backward compatibility. Other connectors and protocol combinations are possible and within the scope of this invention. The ISO12098 connection has 15 wires, although in principle the invention can be implemented in an electrical interface with at least 4 wires. At a level of generality, one wire or more is connected to ground and one or more carries supply voltage. Each wire within the ISO12098 connector currently carries a discrete signal or is connected to ground. However, in the invention at least 2 wires that currently carry discrete signals can be used as one pair, although it would be possible to use more than two wires if available. This pair of wires is then able to carry a digital differential signal, possibly at a lower voltage, which will allow high data rate transfer. The information associated with the discrete signals can be multiplexed on the digital bus and sent at appropriate intervals. In this way the information is not lost. Depending on how many discrete wire pairs are available, different standard physical layers (e.g. IEEE 802, BroadR-Reach) with associated transfer rates can be used The interface cable is modified in such a way that the 8 wires that conduct discrete signals conform to the relevant standard (ANSI/TIA/EIA-568-A) for a category 5 cable. In this way the cable can carry discrete signals and digital differential signals with a transfer rate up to 1 Gbit/s.

In order to facilitate digital communication as well as backward compatibility, an ECU or IC is placed close to the connector on the towing and towed vehicle. This component is configured to automatically detect if the connected communications partner is compatible with digital signals or expects discrete signals. Accordingly, it can switch between a "high speed" and "legacy" mode. The legacy mode is also the "safe" mode that the system enters if there should be any fault with the ECU/IC or other relevant components. In its simplest form this can be achieved by circuit of one depletion type and one enhancement type FET for each discrete wire.

The pinning of the ISO12098 connector and those wires preferably used for digital signal transmission is shown in the table below

| # | Signal | Color | Wire gauge mm$^2$ | Preferably used for digital signal transmission |
|---|---|---|---|---|
| 1 | Left Turn Signal | Yellow | 1.5 | Yes |
| 2 | Right Turn Signal | Green | 1.5 | Yes |
| 3 | Rear fog lamps | Blue | 1.5 | Yes |
| 4 | Ground (−) for pin 1-3 and 5-12 | White | 2.5 | No |
| 5 | Tail lamps, clearance lamps/outline marker lamps, identification lamps and registration plate lamp left side | Black | 1.5 | Yes |
| 6 | Tail lamps, clearance lamps/outline marker lamps, identification lamps and registration plate lamp right side | Brown | 1.5 | Yes |
| 7 | Stop lamps | Red | 1.5 | Yes |
| 8 | Reversing lamps | Pink | 1.5 | Yes |
| 9 | +24 V permanent | Orange | 2.5 | No |
| 10 | Brake wear indicator | Grey | 1.5 | Yes |
| 11 | Indication of applied parking brake due to loss of air pressure | Black/White | 1.5 | Yes |
| 12 | Lift Axle | Blue/White | 1.5 | Yes |
| 13 | ground (−) for pin 14 and 15 | Red/White | 2.5 | No |
| 14 | CAN H (ISO11992-3) | Green/White | 1.5 | No |
| 15 | CAN L (ISO11992-3) | Brown/White | 1.5 | No |

Out of the 15 wires available, 10 can be used as wire pairs for digital transmission. As only 4 pairs are required for the IEEE 802.3ab protocol, either 4 pairs are designed to conform with a category 5 cable (impedances, distance per twist, etc.) and 2 wires are left to carry discrete signals or 5 pairs are designed conform to category 5 cable standards and spare wire pair is used for any cable faults for additional safety.

The ground and supply wires remain unchanged as do wires already carrying digital signals, such as those for the ISO11992-3 CAN bus. This bus can be used as a safety relevant bus and potentially be used to determine "high speed" and "legacy".

Figure 2:
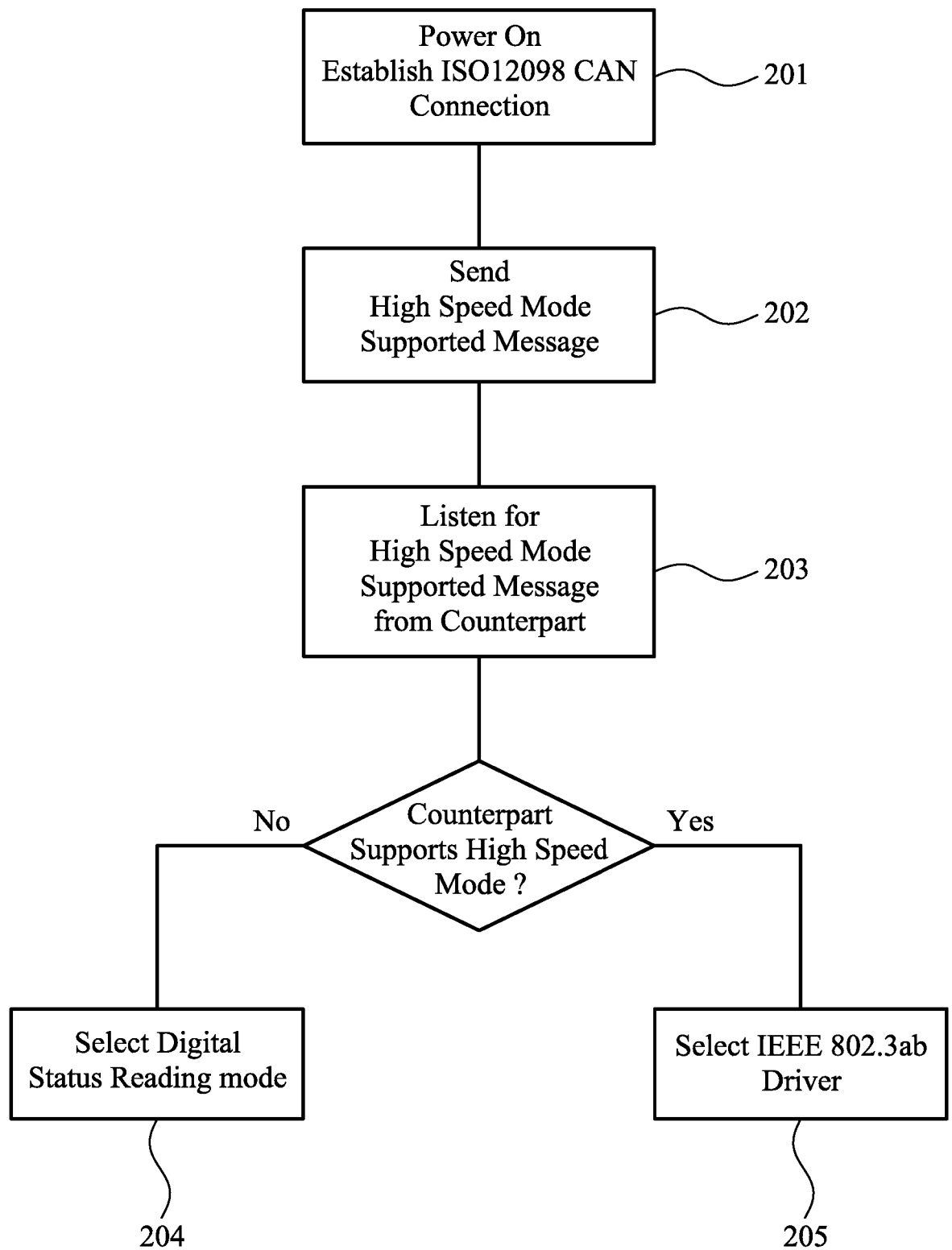
FIG. 2 shows a flowchart on detection of high speed mode.

FIG. 2 shows a flowchart for the determination of whether high speed mode is supported. In the first step 201 after the trailer and truck are connected and power is switched on, an ISO 11992 CAN connection is established over the ISO 12098 connector between truck and trailer. In the second step 202, the ECU sends a message on the bus to see if high speed mode is supported. The ECU then in step 203 listens for a high speed message supported signal from the counterpart ECU on the truck or trailer, respectively. If, after a predetermined time interval has passed and no confirmation has been received that the counterpart supports a high speed mode, then the ECU selects in step 204 a digital status reading mode. If a signal is received that confirms that high speed mode is supported, then the ECU selected the IEE 802.3ab Driver in step 205.

Figure 3:
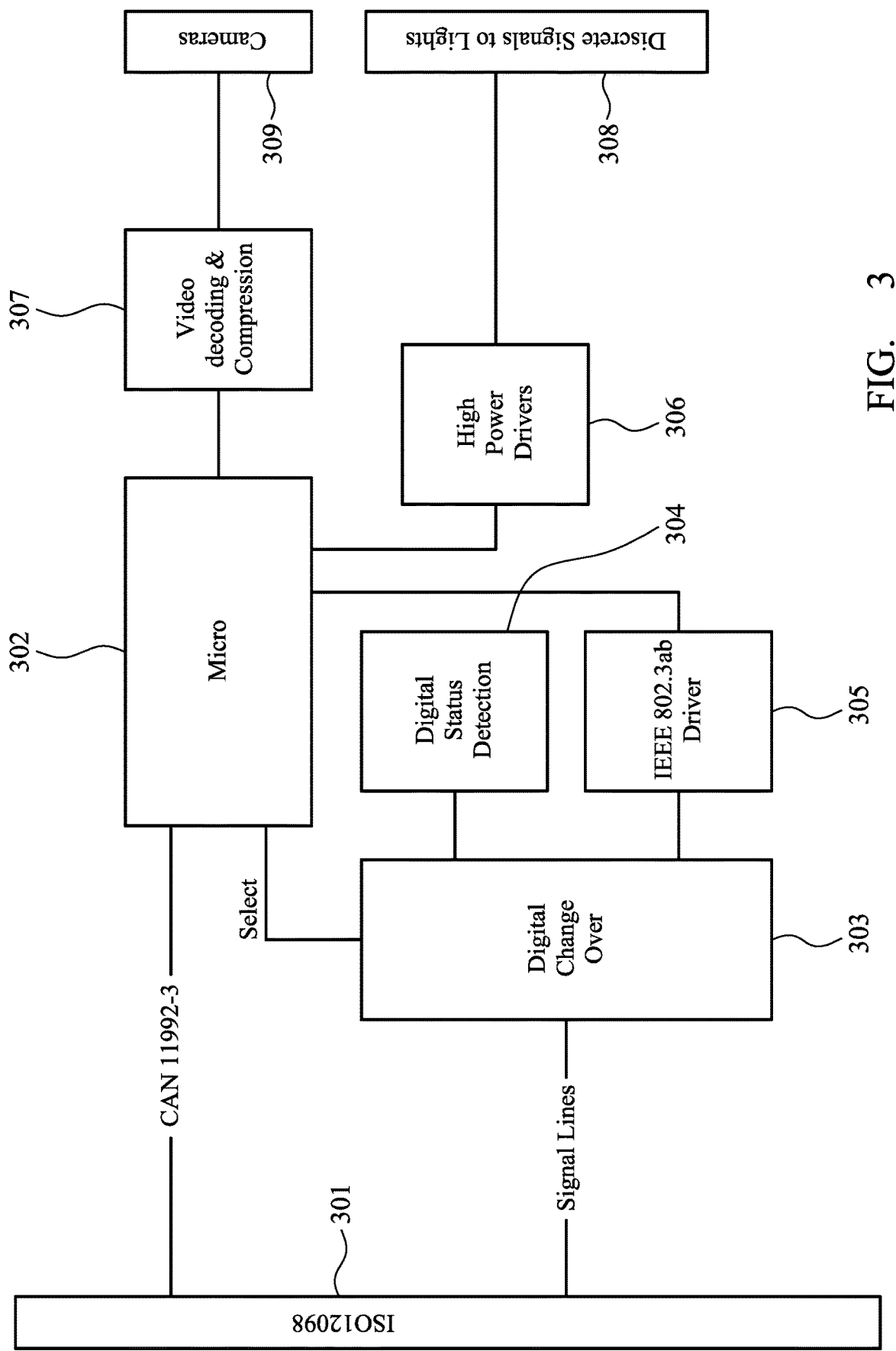
FIG. 3 shows schematically the arrangement of a connector.

FIG. 3 shows schematically the arrangement of a connector with the ISO 12098 interface 301 with the CAN bus (ISO 11992-3) lines connecting directing to the ECU 302. The signal lines from the interface 301 are connected to digital change over 303, which is connected directly to the ECU 302 as well as indirectly via Digital Status Detection 304 and the IEE 802.3ab Driver 305, which is arranged in parallel to the Digital Status Detection 304. The ECU 302 is then further configured to supply control signals to the high power drivers 306 which control the signals to the vehicle lights 308 and to a video decoding and compression unit 307 which receives signals from cameras 309.

Figure 4:
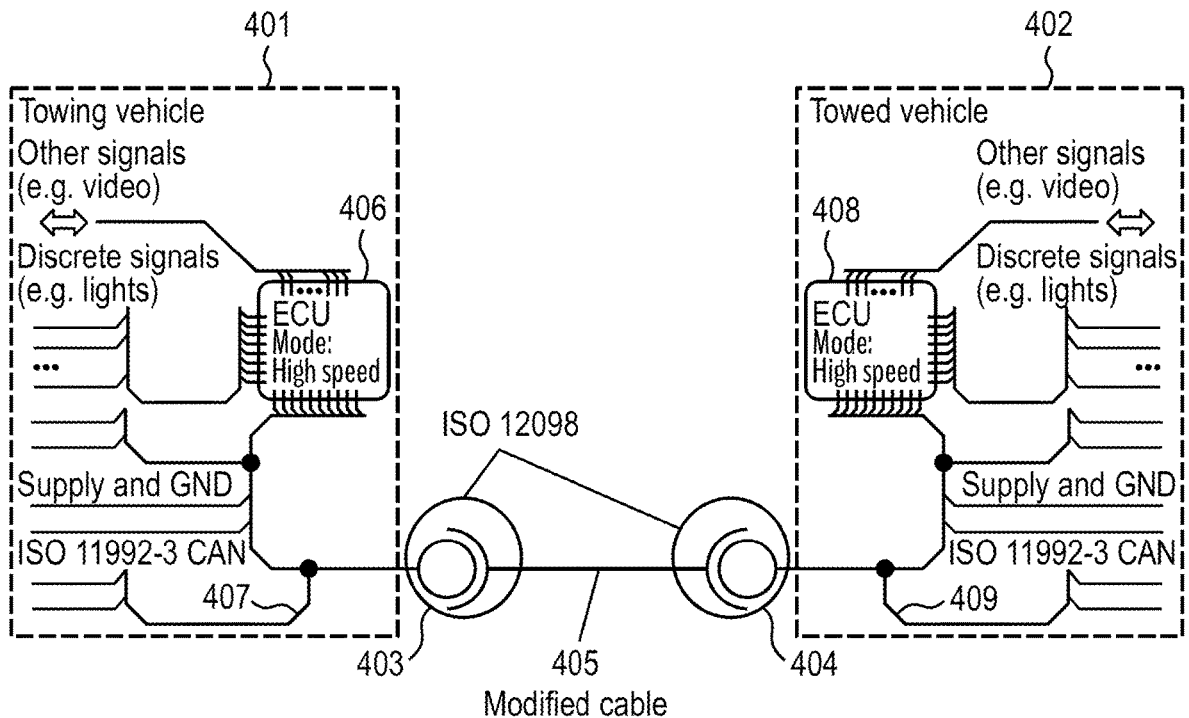
FIG. 4 shows schematically digital communication between the towing and towed vehicle.

FIG. 4 shows schematically digital communication between a towing 401 and towed vehicle 402. The vehicle combination is provided with respective ISO 12098 connectors 403 and 404, which are joined by a cable 405. A first ECU 406 is provided on the towing vehicle 401, which ECU 406 receives signals such as video and discrete signals, such as for vehicle lights, as well as supply and ground. The ECU 406 is connected to the connector 403 and also connected to the ISO 11992-3 bus 407.

A second ECU 408 is provided on the towed vehicle 402, which ECU 408 receives signals such as video and discrete signals, such as for vehicle lights, as well as supply and ground. The ECU 408 is connected to the connector 404 and also connected to the ISO 11992-3 bus 409.

In a first variant, the wires on pins 1, 2, 3, 5, 6, 7, 8 and 10 are used to form four twisted pairs, which conform to the Category 5 standard. Wires 11 and 12 remain as with a conventional ISO 12098 connection.

In a second variant, wires 11 and 12 are also used to make a fifth twisted pair, which conforms to the Category 5 standard.

Figure 5:
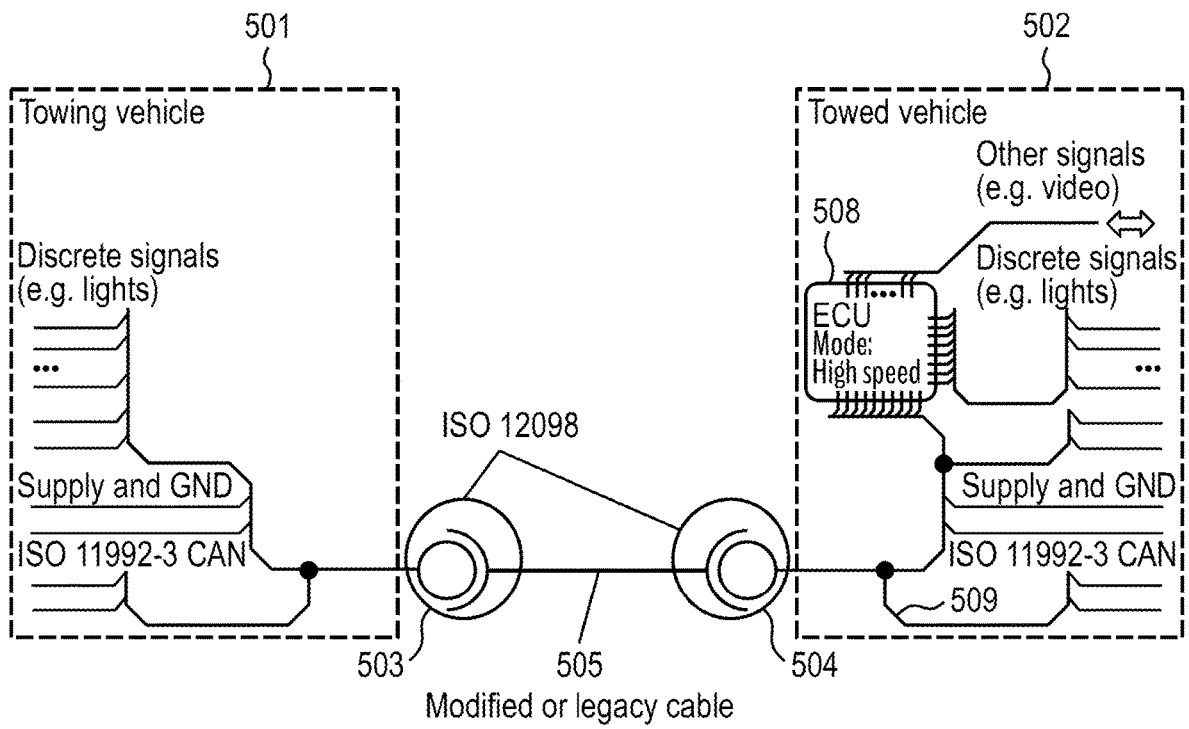
FIG. 5 shows schematically communication between a towing and towed vehicle.

FIG. 5 shows schematically communication between a towing 501 and towed vehicle 502. The vehicle combination is provided with respective ISO 12098 connectors 503 and 504, which are joined by a cable 505. The towing vehicle is a legacy vehicle without the ECU shown in FIG. 4.

The trailer is provided with an ECU 508, which ECU 508 receives signals such as video and discrete signals, such as for vehicle lights, as well as supply and ground. The ECU 508 is connected to the connector 504 and also connected to the ISO 11992-3 bus 509. However, when the ISO12098 connection is powered, the ECU 508 detects that the towing vehicle is not able to communicate with high speed data and switches to a legacy mode in which the wires in the connection cable are used conventionally.

The invention claimed is:

1. A communication interface for high speed communication between a towing vehicle and a towed vehicle, comprising:
   a connector of the towing vehicle and a connector of the towed vehicle, which connectors are connected via a cable, wherein
   the connectors are compliant with a standard selected from ISO12098, ISO7638, ISO1185, ISO3731, ISO11446, and each connector has at least four pins for carrying discrete signals, and
   at least two pins of the at least four pins of the standards-compliant connector for carrying discrete signals of the towing vehicle are connected to at least two pins for carrying discrete signals of a standards compliant connector of the towed vehicle by a twisted pair of wires adapted to carry a digital differential signal at a maximum transfer rate greater than a maximum transfer rate permitted by the standard.

2. The communications interface according to claim 1, wherein
the twisted pairs of wire carry the digital differential signal at a lower voltage to the discrete signals.

3. The communications interface according to claim 2, wherein further digital signals are transmissible between the towing vehicle and the towed vehicle via a ISO11992-3 CAN bus.

4. The communications interface according to claim 1, further comprising:
an ECU or IC placed close to a respective connector on the towing and towed vehicle, which ECU or IC is configured to automatically detect if the towing vehicle and the towed vehicle are compatible for transmission of the discrete signals or expects the discrete signals over the communications interface.

5. The communications interface according to claim 4, wherein the ECU or IC is adapted to switch between a high speed communication and legacy communication mode if the ECU or IC detects that the towing vehicle and the towed vehicle are not compatible.

6. The communications interface according to claim 5, wherein the legacy communication mode is also a safe mode that the communications interface enters if there should be any fault with the ECU or IC or other relevant components.

7. The communications interface according to claim 1, wherein an arrangement of ground and supply wires between the towing vehicle and towed vehicle in the communication interface is the same as an arrangement of ground and supply wires defined under the selected connector standard.

8. The communications interface according to claim 3, wherein a CAN bus is used as a safety relevant bus and is used to determine if a high speed or legacy connection should be established.

9. The communications interface according to claim 1, wherein the ISO 12098 connector has 15 pins and wires on pins 1,2,3,5,6,7,8 and 10 of the ISO12098 connector are used to form four twisted pairs, which conform to Category 5 standard.

* * * * *